US009660997B2

(12) United States Patent
Faitelson et al.

(10) Patent No.: US 9,660,997 B2
(45) Date of Patent: *May 23, 2017

(54) ACCESS PERMISSIONS ENTITLEMENT REVIEW

(71) Applicant: VARONIS SYSTEMS, INC., New York, NY (US)

(72) Inventors: Yakov Faitelson, Elkana (IL); Ohad Korkus, Herzilia (IL); Ophir Kretzer-Katzir, Reut (IL); David Bass, Beit Hashmonai (IL)

(73) Assignee: VARONIS SYSTEMS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/755,219

(22) Filed: Jun. 30, 2015

(65) Prior Publication Data

US 2015/0304335 A1    Oct. 22, 2015

Related U.S. Application Data

(63) Continuation of application No. 14/068,554, filed on Oct. 31, 2013, now Pat. No. 9,106,669, which is a
(Continued)

(51) Int. Cl.
*H04L 29/06* (2006.01)
*G06F 21/60* (2013.01)
*G06Q 10/10* (2012.01)

(52) U.S. Cl.
CPC ......... *H04L 63/101* (2013.01); *G06F 21/604* (2013.01); *G06Q 10/10* (2013.01);
(Continued)

(58) Field of Classification Search
CPC ........... G06F 21/604; G06F 2221/2141; H04L 63/101; H04L 63/105; H04L 63/20; H04L 63/104; G06Q 10/10
(Continued)

(56) References Cited

U.S. PATENT DOCUMENTS 5,465,387 A    11/1995  Mukherjee
5,889,952 A    3/1999   Hunnicutt et al.
(Continued)

FOREIGN PATENT DOCUMENTS

CN      1588889 A      3/2005
WO   2011/092684 A1    8/2011

OTHER PUBLICATIONS

Sahadeb De, et al; "Secure Access Control in a Multi-user Geodatabase", available on the Internet at the URL http://www10.giscafe.com.2005.
(Continued)

*Primary Examiner* — William Powers
*Assistant Examiner* — Aubrey Wyszynski
(74) *Attorney, Agent, or Firm* — Ladas & Parry LLP

(57) ABSTRACT

A system for operating an enterprise computer network including multiple network objects, said system comprising monitoring and collection functionality for obtaining continuously updated information regarding at least one of access permissions and actual usage of said network objects, and entitlement review by owner functionality operative to present to at least one owner of at least one network object a visually sensible indication of authorization status including a specific indication of users which were not yet authorized by said at least one owner of said at least one network object.

10 Claims, 2 Drawing Sheets

Related U.S. Application Data continuation of application No. 12/814,807, filed on Jun. 14, 2010, now Pat. No. 8,578,507.

(60) Provisional application No. 61/240,726, filed on Sep. 9, 2009.

(52) U.S. Cl.
CPC .......... *H04L 63/104* (2013.01); *H04L 63/105* (2013.01); *H04L 63/20* (2013.01); *G06F 2221/2141* (2013.01)

(58) Field of Classification Search
USPC .......................................................... 726/4
See application file for complete search history.

(56) References Cited

U.S. PATENT DOCUMENTS

| | | | |
|---|---|---|---|
| 5,899,991 A | 5/1999 | Karch | |
| 6,023,765 A | 2/2000 | Kuhn | |
| 6,308,173 B1 | 10/2001 | Glasser et al. | |
| 6,338,082 B1 | 1/2002 | Schneider | |
| 6,393,468 B1 | 5/2002 | McGee | |
| 6,772,350 B1 | 8/2004 | Belani et al. | |
| 6,928,439 B2 | 8/2005 | Satoh | |
| 7,031,984 B2 | 4/2006 | Kawamura et al. | |
| 7,068,592 B1 | 6/2006 | Duvaut et al. | |
| 7,403,925 B2 | 7/2008 | Schlesinger et al. | |
| 7,421,740 B2 | 9/2008 | Fey et al. | |
| 7,555,482 B2 | 6/2009 | Korkus | |
| 7,606,801 B2 | 10/2009 | Faitelson | |
| 7,716,240 B2 | 5/2010 | Lim | |
| 7,743,420 B2 | 6/2010 | Shulman et al. | |
| 8,578,507 B2 * | 11/2013 | Faitelson | G06F 21/604 709/224 |
| 9,106,669 B2 * | 8/2015 | Faitelson | G06F 21/604 |
| 2003/0048301 A1 | 3/2003 | Menninger | |
| 2003/0051026 A1 | 3/2003 | Carter et al. | |
| 2003/0231207 A1 | 12/2003 | Huang | |
| 2004/0030915 A1 | 2/2004 | Sameshima et al. | |
| 2004/0186809 A1 | 9/2004 | Schlesinger et al. | |
| 2004/0205342 A1 | 10/2004 | Roegner | |
| 2004/0249847 A1 | 12/2004 | Wang et al. | |
| 2004/0254919 A1 | 12/2004 | Giuseppini | |
| 2005/0086529 A1 | 4/2005 | Buchsbaum | |
| 2005/0108206 A1 | 5/2005 | Lam et al. | |
| 2005/0120054 A1 | 6/2005 | Shulman et al. | |
| 2005/0203881 A1 | 9/2005 | Sakamoto et al. | |
| 2005/0246762 A1 | 11/2005 | Girouard et al. | |
| 2005/0276334 A1 | 12/2005 | Fey et al. | |
| 2006/0064313 A1 | 3/2006 | Steinbarth et al. | |
| 2006/0184459 A1 | 8/2006 | Parida | |
| 2006/0184530 A1 | 8/2006 | Song et al. | |
| 2006/0277184 A1 | 12/2006 | Faitelson et al. | |
| 2007/0011091 A1 | 1/2007 | Smith | |
| 2007/0061487 A1 | 3/2007 | Moore et al. | |
| 2007/0073698 A1 | 3/2007 | Kanayama et al. | |
| 2007/0112743 A1 | 5/2007 | Giampaolo et al. | |
| 2007/0156693 A1 | 7/2007 | Soin et al. | |
| 2007/0198608 A1 | 8/2007 | Prahlad et al. | |
| 2007/0203872 A1 | 8/2007 | Flinn et al. | |
| 2007/0244899 A1 | 10/2007 | Faitelson et al. | |
| 2007/0266006 A1 | 11/2007 | Buss | |
| 2007/0282855 A1 | 12/2007 | Chen et al. | |
| 2008/0097998 A1 | 4/2008 | Herbach | |
| 2008/0162707 A1 | 7/2008 | Beck et al. | |
| 2008/0209535 A1 | 8/2008 | Athey et al. | |
| 2008/0256619 A1 | 10/2008 | Neystadt et al. | |
| 2008/0271157 A1 | 10/2008 | Faitelson et al. | |
| 2009/0031418 A1 | 1/2009 | Matsuda et al. | |
| 2009/0100058 A1 | 4/2009 | Faitelson et al. | |
| 2009/0119298 A1 | 5/2009 | Faitelson et al. | |
| 2009/0265780 A1 | 10/2009 | Korkus et al. | |
| 2009/0320088 A1 | 12/2009 | Gill et al. | |
| 2011/0061111 A1 | 3/2011 | Faitelson et al. | |
| 2014/0059654 A1 | 2/2014 | Faitelson et al. | |

OTHER PUBLICATIONS

Findutils-GNU Project-Free Software Foundation (FSF), 3 pages, Nov. 2006.

Genunix; Writing Filesystems-VFS and Vnode Interfaces-Genunix, 5 pages, Oct. 2007.

S.R. Kleiman; "Vnodes: An Architecture for Multiple File System Types in Sun UNIX", USENIX Association: Summer Conference Proceedings, Atlanta 1986.

Sara C Madeira, et al; "Biclustering Algorithms for Biological Data Analysis: A Survey", IEEE Transactions on Computational Biology and Bioinformatics, vol. 1, No. 1, Jan.-Mar. 2004; 22 pages; http://www.cs.princeton.edu/courses/archive/spr05/cos598E/bib/bicluster.pdf.

Sara C. Madeira; Clustering, Fuzzy Clustering and Biclustering: An Overview; pp. 31-53, Jun. 27, 2003.

International Preliminary Report on Patentability issued Jul. 31, 2012; PCT/IL2011/000065.

International Preliminary Report on Patentability issued Mar. 13, 2012; PCT/IL2010/000069.

International Preliminary Report on Patentability issued Jul. 31, 2012; PCT/IL2011/000078.

International Search Report and Written Opinion dated May 23, 2011; PCT/IL11/00065.

International Search Report and Written Opinion dated May 20, 2010; PCT/IL10/00069.

International Search Report and Written Opinion dated May 24, 2011; PCT/IL11/00077.

International Search Report and Written Opinion dated May 25, 2011; PCT/IL11/00078.

First Chinese Office Action issued Aug. 5, 2014; Appln. No. 201180007244.7.

Chinese Notice of Patent Grant mailed Apr. 8, 2015; Appln. No. 201180007244.7.

U.S. Appl. No. 61/240,726, filed Sep. 9, 2009.

USPTO NFOA and Examiner Interview mailed Feb. 12, 2008 in connection with U.S. Appl. No. 11/258,256.

USPTO FOA mailed Aug. 1, 2008 in connection with U.S. Appl. No. 11/258,256.

USPTO NFOA mailed Oct. 31, 2008 in connection with U.S. Appl. No. 11/635,736.

USPTO NFOA mailed Dec. 14, 2010 in connection with U.S. Appl. No. 11/786,522.

USPTO NFOA mailed Mar. 13, 2012 in connection with U.S. Appl. No. 11/786,522.

USPTO NFOA mailed Jul. 9, 2010 in connection with U.S. Appl. No. 11/789,884.

USPTO FOA mailed Dec. 14, 2010 in connection with U.S. Appl. No. 11/789,884.

USPTO NFOA dated Jul. 5, 2012 in connection with U.S. Appl. No. 12/772,450.

USPTO NFOA dated Jun. 22, 2012 in connection with U.S. Appl. No. 12/814,807.

USPTO FOA dated Mar. 4, 2013 in connection with U.S. Appl. No. 12/814,807.

USPTO NOA mailed Jul. 12, 2013 in connection with U.S. Appl. No. 12/814,807.

USPTO FOA dated Feb. 14, 2013 in connection with U.S. Appl. No. 13/041,762.

USPTO FOA dated Mar. 25, 2013 in connection with U.S. Appl. No. 13/303,826.

USPTO NFOA dated Jun. 12, 2014 in connection with U.S. Appl. No. 14/068,554.

USPTO FOA dated Oct. 2, 2014 in connection with U.S. Appl. No. 14/068,554.

USPTO AA dated Jan. 20, 2015 in connection with U.S. Appl. No. 14/068,554.

(56) References Cited

OTHER PUBLICATIONS

USPTO NOA mailed Apr. 13, 2015 in connection with U.S. Appl. No. 14/068,554.

* cited by examiner

ACCESS PERMISSIONS ENTITLEMENT REVIEW

REFERENCE TO RELATED APPLICATIONS

Reference is made to U.S. Provisional Patent Application Ser. No. 61/240,726, filed Sep. 9, 2009 and entitled "USE OF ACCESS METRIC IN LARGE SCALE DATA MANIPULATION", the disclosure of which is hereby incorporated by reference and priority of which is hereby claimed pursuant to 37 CFR 1.78(a) (4) and (5)(i).

Reference is also made to U.S. patent application Ser. No. 12/673,691, filed Jan. 27, 2010, and entitled "ENTERPRISE LEVEL DATA MANAGEMENT", the disclosure of which is hereby incorporated by reference and priority of which is hereby claimed pursuant to 37 CFR 1.78(a) (1) and (2)(i).

Reference is also made to the following patents and patent applications, owned by assignee, the disclosures of which are hereby incorporated by reference:

U.S. Pat. Nos. 7,555,482 and 7,606,801; and

U.S. Published Patent Application Nos. 2007/0244899, 2008/0271157, 2009/0100058, 2009/0119298 and 2009/0265780.

FIELD OF THE INVENTION

The present invention relates to data management generally and more particularly enterprise level data management.

BACKGROUND OF THE INVENTION

The following patent publications are believed to represent the current state of the art:

U.S. Pat. Nos. 5,465,387; 5,899,991; 6,338,082; 6,393,468; 6,928,439; 7,031,984; 7,068,592; 7,403,925; 7,421,740; 7,555,482 and 7,606,801; and U.S. Published Patent Application Nos.: 2003/0051026; 2004/0249847; 2005/0108206; 2005/0203881; 2005/0120054; 2005/0086529; 2006/0064313; 2006/0184530; 2006/0184459 and 2007/0203872.

SUMMARY OF THE INVENTION

The present invention provides improved systems and methodologies for data management.

There is thus provided in accordance with a preferred embodiment of the present invention a system for operating an enterprise computer network including multiple network objects, the system including monitoring and collection functionality for obtaining continuously updated information regarding at least one of access permissions and actual usage of the network objects, and entitlement review by owner functionality operative to present to at least one owner of at least one network object a visually sensible indication of authorization status including a specific indication of users which were not yet authorized by the at least one owner of the at least one network object.

Preferably, the system resides on a computer server which is connected to an enterprise level network to which is connected a multiplicity of computers and storage devices.

In accordance with a preferred embodiment of the present invention, the entitlement review by owner functionality is operative to periodically present to the at least one owner of the at least one network object the visually sensible indication of authorization status. Additionally, the visually sensible indication of authorization status includes a list of network objects owned by the at least one owner of the at least one network object.

Preferably, for each of the list of network objects, the visually sensible indication of authorization status includes a list of users and user groups having access permissions to each of the list of network objects. Additionally, for each of the list of users and user groups having access permissions to each of the list of network objects the authorization status includes at least an indication of whether the access permissions were not authorized by the at least one owner of the at least one network object.

There is also provided in accordance with another preferred embodiment of the present invention a system for operating an enterprise computer network including multiple network objects, the system including monitoring and collection functionality for obtaining continuously updated information regarding at least one of access permissions and actual usage of the network objects, and entitlement review by owner functionality operative to present to at least one owner of at least one network object a visually sensible indication of authorization status, and to require the at least one owner to confirm or modify the authorization status.

Preferably, the system resides on a computer server which is connected to an enterprise level network to which is connected a multiplicity of computers and storage devices.

In accordance with a preferred embodiment of the present invention, the entitlement review by owner functionality is operative to periodically present to the at least one owner of the at least one network object the visually sensible indication of authorization status and to periodically require the at least one owner to confirm or modify the authorization status. Additionally, the visually sensible indication of authorization status includes a list of network objects owned by the at least one owner of the at least one network object.

Preferably, for each of the list of network objects, the visually sensible indication of authorization status includes a list of users and user groups having access permissions to each of the list of network objects. Additionally, for each of the list of users and user groups having access permissions to each of the list of network objects the authorization status includes at least an indication of whether the access permissions were not authorized by the at least one owner of the at least one network object and a revocation recommendation to the at least one owner of the at least one network object recommending whether the access permissions should be revoked from the user or user group.

Preferably, the revocation recommendation includes a textual justification for the revocation recommendation. Additionally or alternatively the entitlement review by owner functionality includes access permissions modifying functionality. Preferably, the access permissions modifying functionality is preset to modify access permissions in accordance with the revocation recommendations.

In accordance with a preferred embodiment of the present invention, when the at least one owner of the at least one network object utilizes the access permissions modifying functionality to modify access permissions to any of the list of network objects, the entitlement review by owner functionality requires the at least one owner of the at least one network object to write a justification for modifying access permissions to any of the list of network objects. Preferably, when the at least one owner of the at least one network object chooses to disregard the revocation recommendation associated with the at least one network object, the entitlement review by owner functionality requires the at least one owner of the at least one network object to write a justification for disregarding the revocation recommendation associated with the at least one network object.

There is further provided in accordance with yet another preferred embodiment of the present invention a method for operating an enterprise computer network including multiple network objects, the method including monitoring and collecting continuously updated information regarding at least one of access permissions and actual usage of the network objects, and presenting to at least one owner of at least one network object an entitlement review which includes a visually sensible indication of authorization status including a specific indication of users which were not yet authorized by the at least one owner of the at least one network object.

There is yet further provided in accordance with still another preferred embodiment of the present invention a method for operating an enterprise computer network including multiple network objects, the method including monitoring and collecting continuously updated information regarding at least one of access permissions and actual usage of the network objects, and presenting to at least one owner of at least one network object an entitlement review which includes a visually sensible indication of authorization status, and requiring the at least one owner to confirm or modify the authorization status.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
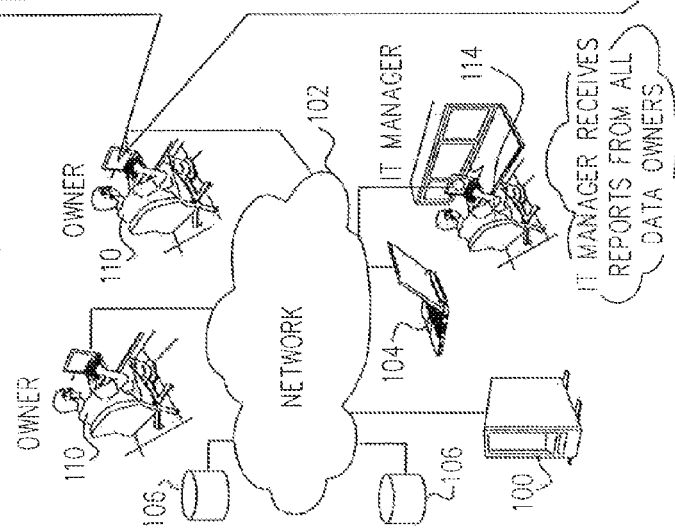
FIGS. 1A and 1B are simplified illustrations of the operation of an access permissions entitlement system, constructed and operative in accordance with a preferred embodiment of the present invention.
Figure 1B:
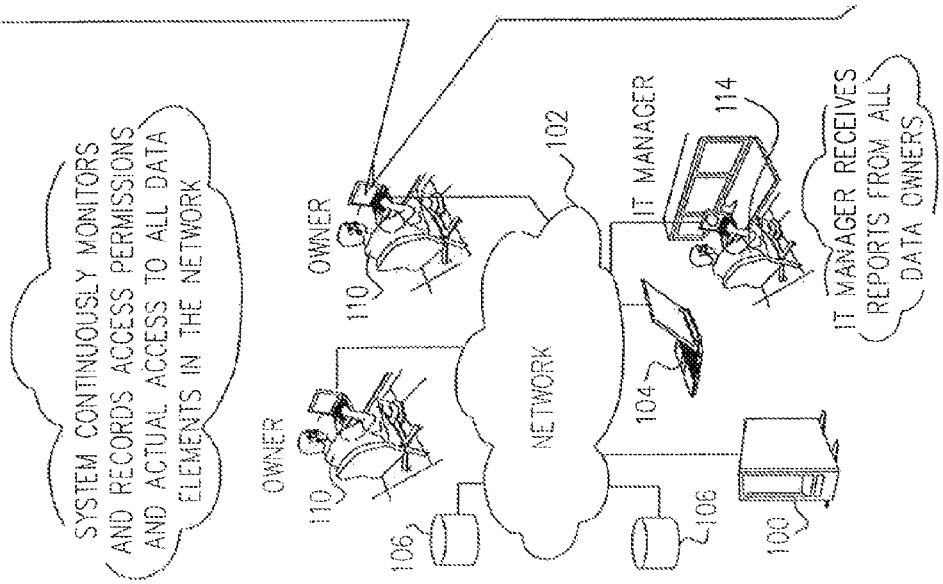

Reference is now made to FIGS. 1A and 1B which are simplified diagrams illustrating an access permissions entitlement system, constructed and operative in accordance with a preferred embodiment of the present invention.

This system is preferably suitable for operating an enterprise computer network including multiple network objects such as disparate users, user groups and network resources, and includes:

monitoring and collection functionality for obtaining continuously updated information regarding at least one of access permissions and actual usage of the network objects; and entitlement review by owner functionality operative to present to at least one owner of at least one network object a visually sensible indication of authorization status including a specific indication of users which were not yet authorized by the at least one owner of the at least one network object, and to require the at least one owner to confirm or modify the authorization status.

The term "network object" for the purposes of this application is defined to include user generated enterprise computer network resources on any commercially available computer operating system. Examples of network objects include structured and unstructured computer data resources such as files and folders, and user groups.

The owner of a network object is responsible for the authorization of permissions to the network object. For example, permissions may include read or write permissions to a file, modification permissions to a folder (e.g. permissions to create or delete files), and modification permissions to a user group (e.g. permissions to add or remove a user from the group).

As seen in FIG. 1A, the system may reside on a server 100, connected to an enterprise level network 102, to which may be connected hundreds or thousands of computers 104 and storage devices 106. A matrix (not shown) is defined at any given time, including all of the network objects in the enterprise at that time. Various aspects of changes made to access permissions of network objects and actual usage of network objects are applied to the matrix by the system.

Periodically, the system presents to all network object owners in the network a data entitlement review. For example, as seen in FIG. 1A, on Jul. 1, 2009 at 9:00 AM a network object owner 110 is provided with a quarterly entitlement review 112, which the network object owner 110 is required to review, modify if necessary and approve.

The quarterly entitlement review 112 preferably includes a list of folders owned by the network object owner 110. For each folder, the entitlement review 112 preferably includes a list of users and user groups currently having access permissions to the folder, and for each of the users and user groups currently having access permissions to the folder, the entitlement review 112 preferably includes:

an indication of whether the access permissions were not previously authorized by the network object owner 110;

a revocation recommendation, which may be provided by the system to the network object owner 110 recommending that the access permissions be revoked from the user or user group;

access permissions modifying functionality comprising an "allow" option and a "remove" option, whereby the system preselects one of the two options on the basis of the current state of the system and the revocation recommendation; and an explanation text field to be filled in by the network object owner 110 upon modifying the current access permissions, whether as a result of a revocation recommendation or not, or upon deciding to disregard a revocation recommendation. Where a revocation recommendation is provided by the system, the explanation field will be pre-filled by the system, and will contain a brief justification for the revocation recommendation.

For example, as seen in FIG. 1A, the entitlement review 112 indicates that Dan, Sam and Tom, as well as members of user groups group 1 and group 2 currently have access permissions to folder 1, and also indicates that the owner 110 has not authorized Tom's access permissions to folder 1. The entitlement review 112 includes a revocation recommendation to revoke access permissions to folder 1 from Dan, justified by the fact that Dan does not actually access folder 1. The entitlement review 112 also includes a revocation recommendation to revoke access permissions to folder 1 from Tom, justified by the fact that Tom's access permissions to folder 1 were not authorized by owner 110.

As seen in FIG. 1A, at a later time, such as at 9:30 AM, the network object owner 110 reviews the entitlement review 112 and decides to continue to allow Dan access permissions to folder 1, notwithstanding a contrary revocation recommendation provided by the system, and writes a justifying explanation for doing so, the explanation being that Dan requires access to folder 1. The network object owner 110 also decides to revoke access permissions to folder 1 from Tom as recommended by the system.

Upon completing the review and modification of the entitlement review 112, the network object owner 110 preferably approves the report, for example by ticking a check box next to an appropriately worded approval. The network object owner 110 then submits the completed report, for example by clicking a submit button, whereby the report is then submitted to the system and is preferably sent to the enterprise IT manager 114. The system utilizes information in the report to modify access permissions of users to network objects, for example by modifying access permissions of specific users to specific network objects, or by modifying group memberships of specific users whereby membership in specific groups may allow access to specific network objects.

Additionally or alternatively, as seen in FIG. 1B, the quarterly entitlement review 112 provided to the network object owner 110 on Jul. 1, 2009 at 9:00 AM preferably includes a list of user groups owned by the network object owner 110. For each user group, the entitlement review 112 preferably includes a list of users currently having access permissions to the user group, and for each of the users currently having access permissions to the user group, the entitlement review 112 preferably includes

- an indication whether the access permissions were not authorized by the network object owner 110;
- a revocation recommendation which may be provided by the system to the network object owner 110, recommending that the access permissions be revoked from the user;
- an owner decision option button comprising an "allow" option and a "remove" option, whereby the system preselects one of the two options on the basis of the current state of the system and the revocation recommendation; and
- an explanation text field to be filled in by the network object owner 110 upon modifying the current access permissions whether as a result of a revocation recommendation or not, or upon deciding to disregard a revocation recommendation. Where a revocation recommendation is provided by the system, the explanation field will be pre-filled by the system, and will contain a brief justification for the revocation recommendation.

For example, as seen in FIG. 1B, the entitlement review 112 indicates that Dan, Sam and Tom currently have access permissions to group 1, and also indicates that the owner 110 has not authorized Tom's access permissions to group 1. The entitlement review 112 includes a revocation recommendation to revoke access permissions to group 1 from Dan, justified by the fact that Dan does not actually access group 1. The entitlement review 112 also includes a revocation recommendation to revoke access permissions to group 1 from Tom, justified by the fact that Tom's access permissions to group 1 were not authorized by owner 110.

As seen in FIG. 1B, at a later time, such as at 9:30 AM, the network object owner 110 reviews the entitlement review 112 and decides to continue to allow Dan access permissions to group 1, notwithstanding a contrary revocation provided by the system, and writes a justifying explanation for doing so, the explanation being that Dan requires access to group 1. The network object owner 110 also decides to revoke access permissions to group 1 from Tom as recommended by the system.

Upon completing the review and modification of the entitlement review 112, the network object owner 110 preferably approves the report, for example by ticking a check box next to an appropriately worded approval. The network object owner 110 then submits the completed report, for example by clicking a submit button, whereby the report is then submitted to the system and is preferably sent to the enterprise IT manager 114. The system utilizes information in the report to modify access permissions of users to network objects, for example by modifying access permissions of specific users to specific network objects, or by modifying group memberships of specific users whereby membership in specific groups may allow access to specific network objects.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A system for operating an enterprise computer network including multiple network objects, said system comprising:
  at least one monitoring and collection module for obtaining continuously updated information regarding at least one of access permissions and actual usage of said network objects; and
  at least one entitlement review by owner module operative:
    to present to at least one of at least one owner and at least one authorizer of at least one network object a visually sensible indication of authorization status, said visually sensible indication of authorization status including at least a list of users and user groups having access permissions to said at least one network object, said at least one authorizer being delegated responsibility with respect to said at least one network object by said at least one owner;
    to require said at least one of said at least one owner and said at least one authorizer to review said authorization status;
    responsive to said review, to allow said at least one of said at least one owner and said at least one authorizer to modify said authorization status;
    responsive to said at least one of said at least one owner and said at least one authorizer not modifying said authorization status, to require said at least one of said at least one owner and said at least one authorizer to confirm said authorization status; and
    responsive to said at least one of said at least one owner and said at least one authorizer modifying said authorization status, to require said at least one of said at least one owner and said at least one authorizer to confirm said modified authorization status.

2. A system according to claim 1 and wherein said system resides on a computer server which is connected to an enterprise level network to which is connected a multiplicity of computers and storage devices.

3. A system according to claim 1 and wherein said visually sensible indication of authorization status comprises a list of network objects owned by said at least one owner of said at least one network object.

4. A system according to claim 3 and wherein for each of said list of network objects, said visually sensible indication of authorization status comprises a list of users and user groups having access permissions to said each of said list of network objects.

5. A system according to claim 4 and wherein for each of said list of users and user groups having access permissions to said each of said list of network objects said authorization status comprises at least:
- an indication of whether said access permissions were not authorized by said at least one of said at least one owner and said at least one authorizer of said at least one network object; and
- a revocation recommendation to said at least one of said at least one owner and said at least one authorizer of said at least one network object recommending whether said access permissions should be revoked from the user or user group.

6. A system according to claim 5 and wherein said revocation recommendation comprises a textual justification for said revocation recommendation.

7. A system according to claim 6 and wherein said at least one entitlement review by owner module comprises at least one access permissions modifying module.

8. A system according to claim 7 and wherein said at least one access permissions modifying module is preset to modify access permissions in accordance with said revocation recommendations.

9. A system according to claim 8 and wherein when said at least one of said at least one owner and said at least one authorizer of said at least one network object utilizes said at least one access permissions modifying module to modify access permissions to any of said list of network objects, said at least one entitlement review by owner module requires said at least one of said at least one owner and said at least one authorizer of said at least one network object to write a justification for modifying access permissions to any of said list of network objects.

10. A system according to claim 8 and wherein when said at least one of said at least one owner and said at least one authorizer of said at least one network object chooses to disregard said revocation recommendation associated with said at least one network object, said at least one entitlement review by owner module requires said at least at least one of said one owner and said at least one authorizer of said at least one network object to write a justification for disregarding said revocation recommendation associated with said at least one network object.

* * * * *